(12) United States Patent
Pelletier et al.

(10) Patent No.: US 10,757,484 B2
(45) Date of Patent: Aug. 25, 2020

(54) SYSTEMS AND METHODS FOR PULSE-BASED COMMUNICATION

(71) Applicant: Kinetic Technologies, San Jose, CA (US)

(72) Inventors: William Robert Pelletier, Campbell, CA (US); Brian B. North, Los Gatos, CA (US); Jan Nilsson, Sunnyvale, CA (US)

(73) Assignee: Kinetic Technologies, San Jose, CA (US)

( * ) Notice: Subject to any disclaimer, the term of this patent is extended or adjusted under 35 U.S.C. 154(b) by 279 days.

(21) Appl. No.: 15/399,526

(22) Filed: Jan. 5, 2017

(65) Prior Publication Data
US 2018/0191522 A1    Jul. 5, 2018

(51) Int. Cl.
*H04Q 5/14* (2006.01)
*H04L 29/06* (2006.01)
*G08C 19/16* (2006.01)

(52) U.S. Cl.
CPC ............... *H04Q 5/14* (2013.01); *G08C 19/16* (2013.01); *H04L 69/22* (2013.01)

(58) Field of Classification Search
None
See application file for complete search history.

(56) References Cited

U.S. PATENT DOCUMENTS

| 447,918 A * | 3/1891 | Strowger | H04Q 3/00 379/302 |
| 7,430,259 B2 * | 9/2008 | North | H04B 3/56 327/141 |
| 8,631,179 B1 * | 1/2014 | Faulds | G06F 13/364 710/110 |
| 2002/0018513 A1 * | 2/2002 | Curry | G01K 1/028 374/178 |
| 2009/0240859 A1 | 9/2009 | Hsieh | |

(Continued)

OTHER PUBLICATIONS https://web.archive.org Wikipedia web page on Pulse Dialing http://en.wikipedia.org/wiki/Pulse_dialing Nov. 8, 2016 (Year: 2016).*

(Continued)

*Primary Examiner* — Jeffrey M Rutkowski
*Assistant Examiner* — Basil Ma
(74) *Attorney, Agent, or Firm* — Sheppard Mullin Richter & Hampton LLP

(57) ABSTRACT

A system that uses pulse-based communication may include a first device and a plurality of devices on a series connection. The first device may have a master circuit and the plurality devices may have a slave circuit. The master circuit may enable the first device to communicate with the plurality devices having the slave circuit on the series connection. The master circuit may enable the first device to send a pulse string including one or more pulses to the plurality devices. The slave circuit may enable the plurality devices to receive the pulse string from a previous device on the series connection and change the pulse string. The slave circuit may enable the plurality devices to send the pulse string to a next device on the series connection. Each of the plurality devices may determine its address in the series connection based on the pulse string it receives.

17 Claims, 13 Drawing Sheets

(56) References Cited

U.S. PATENT DOCUMENTS

| | | | |
|---|---|---|---|
| 2009/0292840 A1* | 11/2009 | Konnail | G06F 1/3203 |
| | | | 710/61 |
| 2011/0029705 A1 | 2/2011 | Evans | |
| 2011/0176503 A1 | 7/2011 | Patel et al. | |
| 2012/0284429 A1 | 11/2012 | Adkins et al. | |
| 2013/0297829 A1* | 11/2013 | Berenbaum | G06F 13/4256 |
| | | | 710/3 |
| 2016/0292106 A1* | 10/2016 | Spiegel | H04L 12/40019 |

OTHER PUBLICATIONS

Fundamentals of Telephone Communication Systems Western Electric Available at http;//etler.com/docs/WECo/Fundannentals/ Specifically, Chapter 4 on Step-by-Step Switches (Year: 1969).*
Begelow et al "Understanding Telephone Electronics" (Year: 2001).*
International Search Report and Written Opinion for Application No. PCT/US2017/068524 dated Feb. 26, 2018, 10 pages.

* cited by examiner

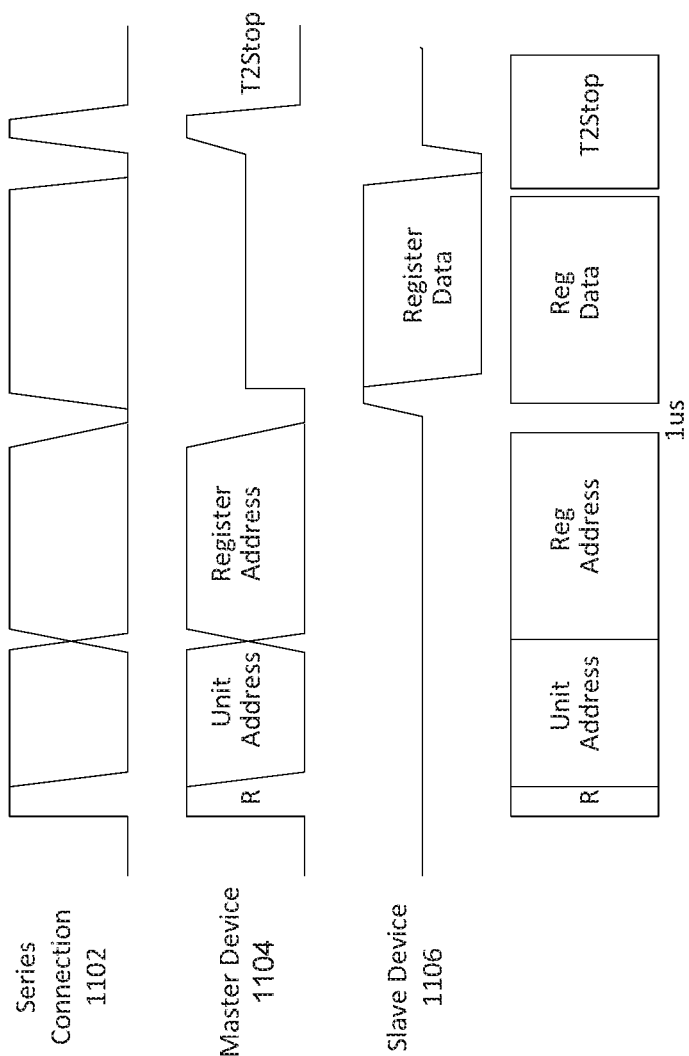

SYSTEMS AND METHODS FOR PULSE-BASED COMMUNICATION

TECHNICAL FIELD

This disclosure relates generally to communications on a series connection, and more specifically to the use of pulse-based communication on a series connection.

BACKGROUND

Using a series connection for multiple devices may allow for efficient management of multiple devices on the series connection. However, additional pins/circuitry may be required to identify and communicate with multiple devices on the series connection that have the same structure.

SUMMARY

This disclosure relates to the use of pulse-based communication on a series connection. A system that uses pulse-based communication may include a first device and a plurality of devices on a series connection. The first device may have a master circuit and the plurality devices may have a slave circuit. The master circuit may enable the first device to communicate with the plurality devices having the slave circuit on the series connection. The master circuit may enable the first device to send a pulse string including one or more pulses to the plurality devices. The slave circuit may enable the plurality devices to receive the pulse string from a previous device on the series connection and change the pulse string. The slave circuit may enable the plurality device to send the pulse string to a next device on the series connection. Each of the plurality devices may be configured to determine its address in the series connection based on the pulse string it receives.

The first device may have the master circuit. The master circuit may enable the first device to communicate with plurality of devices having the slave circuit on a series connection. The master circuit may enable the first device to send a pulse string to the plurality devices on the series connection. The pulse string may include one or more pulses. In some implementations, the series connection may form a loop. The addresses of the plurality devices may be determined based on the pulse string received by the plurality devices. The addresses of the plurality devices on the series connection may be determined based on positions of the plurality devices on the series connection.

Plurality of devices having the slave circuit may be on the series connection. The slave circuit may enable the plurality device to receive the pulse string from a previous device on the series connection. The slave circuit may enable the plurality devices to change the pulse string. In some implementations, the slave circuit may enable the plurality devices to change the pulse string by decreasing the number of pulses within the pulse string. In some implementations, the slave circuit may enable the plurality devices to change the pulse string by increasing the number of pulses within the pulse string. The slave circuit may enable the plurality devices to send the pulse string to a next device on the series connection.

In some implementations, the first device may include a first configurable device configured to operate in a master mode and the plurality devices may include second configurable devices configured to operate in a slave mode.

In some implementations, the plurality devices on the series connection may be symmetrical. In some implementations, the slave circuit may enable the plurality devices on the series connection to determine a direction of communication on the series connection. In some implementations, the slave circuit may further enable the plurality devices on the series connection to change the direction of communication on the series connection.

The master circuit may enable the first device to send a command frame on the series connection. In some implementations, the command frame may include multiple commands addressed to one of the plurality devices on the series connection. In some implementations, the command frame may include multiple commands addressed to two or more of the plurality devices on the series connection. In some implementations, the command frame may include a delay to allow one of the plurality devices on the series connection to change the direction of communication on the series connection.

In some implementations, the command frame may include an execution mode command. The plurality devices may execute commands within the command frame at or after the end of the command frame based on the execution mode command indicating a synchronous mode of command execution. The plurality devices may execute commands within the command frame at the end of individual commands based on the execution mode command indicating a non-synchronous mode of command execution. In some implementations, the synchronous mode of command execution may enable the first device to sequence operations of the plurality devices.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

FIG. 11A illustrates exemplary signals for a single read command in accordance with some implementations of the disclosure.

DETAILED DESCRIPTION

Figure 1A:
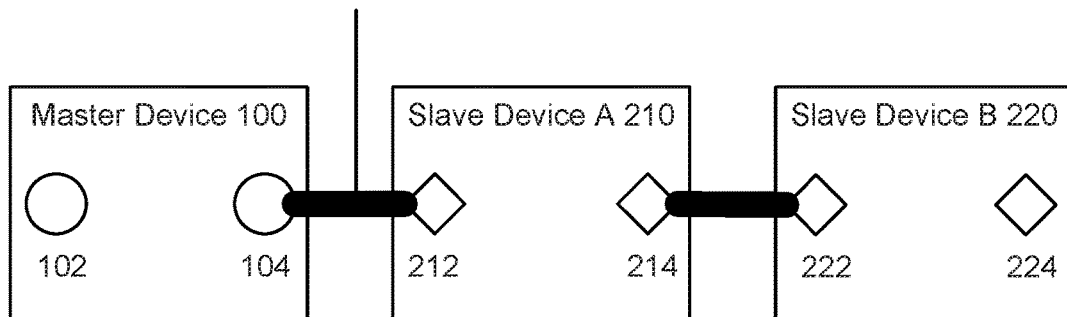
FIGS. 1A-1B illustrate exemplary systems for using pulse-based communication on a series connection in accordance with some implementations of the disclosure.
Figure 1B:
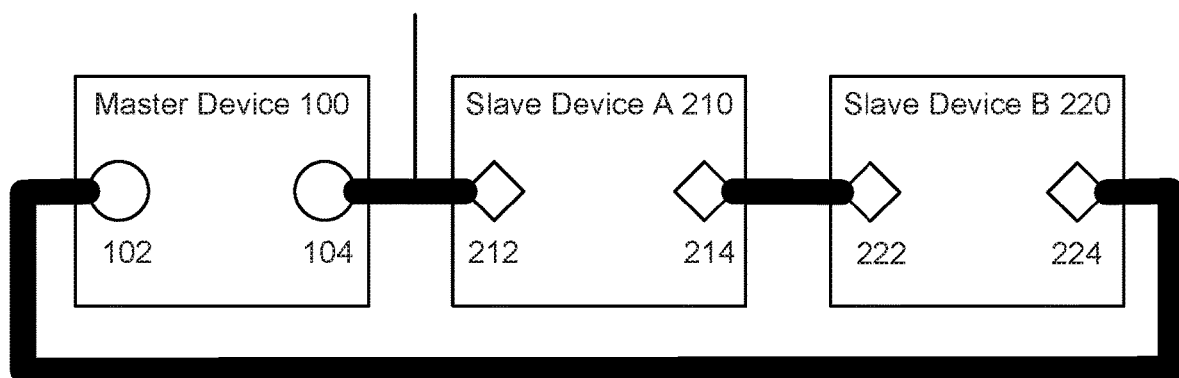

FIGS. 1A-1B illustrate exemplary system 10A, 10B that uses pulse-based communication. System 10A, 10B may include master device 100 and one or more slave devices (e.g., slave device A 210, slave device B 220) on a series connection (e.g., series connection 300A, series connection 300B). Master device 100 may have a master circuit and slave devices 210, 220 may have a slave circuit. The master circuit may enable master device 100 to communicate with multiple slave devices 210, 220 having the slave circuit on series connection 300A, 300B. The addresses of multiple slave devices 210, 220 on series connection 300A, 300B may be determined based on positions of slave devices 210, 220 on series connection 300A, 300B. The positions of slave devices 210, 220 on series connection 300A, 300B may be determined based on a pulse string received by slave devices 210, 220. The pulse string may be sent by master device 100 on series connection 300A, 300B. The pulse string may include one or more pulses. The slave circuit may enable slave device A 210 to receive the pulse string from master device 100 and change the pulse string. The slave circuit may enable slave device A to send the pulse string to slave device B 220 on series connection 300A, 300B. One or more components of system 10A, 10B may be configured to perform one or more steps of method 1200 described below with reference to FIG. 12.

Referring to FIGS. 1A-1B, series connection 300A, 300B may include master device 100, slave device A 210, slave device B 220, and/or other devices. In FIG. 1A, series connection 300A may include master device 100 connected to slave device A 210 and slave device A 210 connected to slave device B 220. In FIG. 1B, series connection 300B may form a loop. Series connection 300B may include master device 100 connected to slave device A 210, slave device A 210 connected to slave device B 220, and slave device B 220 connected to master device 100.

Master device 100 may communicate with slave devices 210 220 on series connection 300A, 300B via pulse-based communication. Master device 100 may manage operation of slave devices 210 220 on series connection 300A, 300B via pulse-based communication. Master device 100 may monitor and/or control slaves devices 210, 220 on series connection 300A, 300B via pulse-based communication. Master device 100 may monitor and/or control devices connected to slave devices 210, 200 via pulse-based communication. Devices connected to slave devices 210, 200 may not include the slave circuit or the master circuit.

In some implementations, master device 100 may provide a single point of interface for managing operation of slave devices 210, 220 (and/or devices connected to slave devices 210, 220) on series connection 300A, 300B. Master device 100 may include one or more connectors (not shown in FIGS. 1A-1B) for communicating with a processor (e.g., SSD controller, system controller, microcontroller, CPU, GPU, application specific standard product). The processor may communicate with master device 100 to manage operation of slave devices 210, 220 (and/or devices connected to slave devices 210, 220) on series connection 300A, 300B. Communication between the processor and master device 100 may allow for monitoring and/or controlling of slave devices 210, 220 on series connection 300A, 300B. Communication between the processor and master device 100 may allow for monitoring and/or controlling of devices connected to slave devices 210, 220. In some implementations, master device 100 may be part of a device containing the processor or may be part of the processor.

The communication between the processor and master device 100 may follow one or more industry protocols/ standards. For example, one or more connectors of master device 100 for communicating with the processor may include an inter-integrated circuit connector and/or other connectors. The processor may receive from and/or send to master device 100 information regarding slave devices 210, 220 and/or other devices connected to slave devices 210, 220 via communication that follows the inter-integrated circuit protocol. Uses of other types of protocols/standards that allow for communication between master device 100 and a processor are contemplated.

Master device 100 may include connectors 102, 104 and/or other connectors. Slave device A 210 may include connectors 212, 214 and/or other connectors. Slave device B 2210 may include connectors 222, 224 and/or other connectors. A connector may refer to one or more hardware and/or software that enables connections between two or more devices. A connector may enable wired and/or wireless connections between two or more devices. As non-limiting examples, a connector may include one or more of a male connector, a female connector, a conductor, a pin, a socket, a node, an access point, and/or other connectors. As non-limiting examples, a wireless connector may enable one or more of radio connection, Bluetooth connection, Wi-Fi connection, cellular connection, infrared connection, optical connection, or other wireless connections.

Master device 100 and/or slave devices 210, 220 may include other components not shown in FIGS. 1A and 1B. For example, master device 100, slave device A 210 and/or slave device B 220 may include one or more of a processor, a memory (volatile and/or non-volatile), internal and external connections, and/or other components. Different slave devices may include the same components. For example, slave device A 210 and slave device B 220 may include one kilobyte of non-volatile memory. Different slave devices may include different components. For example, slave device A 210 and slave device B 220 may include non-volatile memory of different sizes. Some slave devices may include non-volatile memory while other slave devices may not include non-volatile memory.

Communication between master device 100 and one or more of slave device A 210, slave device B 220, and/or other slave devices on series connection 300A, 300B may be bidirectional. For example, referring to FIG. 1A, master device 100 may communicate with slave device B 220 by sending a message from connector 104 to connector 212 of slave device A 210. Slave device A 210 may buffer the message and send the message from connector 214 to connector 222 of slave device B 220. Slave device B 220 may respond to the message with a reply to master device 100. Slave device B 220 may send the reply from connector 222 to connector 214 of slave device A 210. Slave device A may buffer the reply and send the reply from connector 212 to connector 104 of master device. In some implementations, slave devices 210, 220 may communicate with master device 100 asynchronously using interrupts (e.g., to request polling of status).

Referring to FIG. 1B, master device 100 may communicate with slave device A 210 and/or slave device B 220 by sending a message in a clockwise or counter-clockwise direction on series connection 300B. For example, master device 100 may communicate with slave device B 220 by sending a message in a clockwise direction—master device 100 may send the message from connector 104 to connector 212 of slave device A 210, and slave device A 210 may buffer the message and send the message from connector 214 to connector 222 of slave device B 220. Master device 100 may communicate with slave device B 220 by sending a message in a counter-clockwise direction—master device 100 may send the message from connector 102 to connector 224 of slave device B 220.

Slave device A 210 and/or slave device B 220 may communicate with master device 100 and/or another slave device on series connection 300A, 300B by sending a message in a clockwise or counter-clockwise direction. Slave device A 210 and/or slave device B 220 may respond to a message from master device 100 and/or another slave device in the direction in which the message was received or in the direction opposite to the direction in which the message was received. For example, referring to FIG. 1B, master device 100 may send a message to slave device A 210 in a clockwise direction on series connection 300B—the message is sent between connector 104 of master device 100 and connector 212 of slave device A. In some implementations, slave device A 210 may respond to the message by sending a reply to master device 100 in the counter-clockwise direction on series connection 300B, the direction opposite to the direction in which the message was received—the reply is sent between connector 212 of slave device A 210 and connector 104 of master device 100. In some implementations, slave device A 210 may respond to the message by sending a reply to master device 100 in the clockwise direction on series connection 300B, the direction in which the message was received—the reply is sent between connector 214 of slave device A 210 and connector 222 of slave device B 220, and between connector 224 of slave device B 220 and connector 102 of master device 100.

A looped series connection (e.g., series connection 300B) may provide a loop-back path for redundant communication paths. For example, if the connection between master device 100 and slave device A 210 is broken, master device 100 may communicate with slave device B 220 via connector 102 and connector 224. A looped series connection may provide a return path for check on communications on the series connection. For example, master device 100 may send a message using connector 104 and receive the message via connector 102. The message sent using connector 104 may be compared with the message received on connector 102 to confirm that the message was not altered during transmission or altered as expected during transmission.

Master device 100 may have a master circuit and/or other circuits. Slave device A 210 and slave device B 220 may have a slave circuit and/or other circuits. A circuit may refer to a hardware-implemented processor (e.g., computing/processing device with one or more algorithms/logics implemented in hardware to perform one or more functions) and/or a software-implemented processor (e.g., computing/processing device with one or more algorithms/logics implemented in software to perform one or more functions). In some implementations, the slave circuits in different devices (e.g., slave device A 210, slave device B 220) may be different from each other (e.g., include additional/different component, additional different arrangement of components).

The master circuit may enable master device 100 to communicate with slave devices 210, 220 on series connection 300A, 300B. The master circuit may enable master device 100 to send a pulse string on series connection 300A, 300B. The pulse string may include one or more pulses. The slave circuit may enable slave devices 210, 220 to receive the pulse string from a prior device on series connection 300A, 300B. The slave circuit may enable slave devices 210, 220 to change the pulse string. The slave circuit may enable slave devices 210, 220 to send the pulse string to the next device on series connection 300A, 300B.

For example, referring to FIG. 1B, master device 100 may send the pulse string on series connection 300B in a clockwise direction (via connector 104). Slave device A 210 may receive the pulse string from master device 100 (via connector 212), change the pulse string, and send the pulse string to slave device B 220 (via connector 214). Slave device B 220 may receive the pulse string from slave device A 210 (via connector 222) and change the pulse string. As another example, master device 100 may send the pulse string on series connection 300B in a counterclockwise direction (via connector 102). Slave device B 220 may receive the pulse string from master device 100 (via connector 224), change the pulse string, and send the pulse string to save device A 220 (via connector 222). Slave device A 220 may receive the pulse string from slave device B 220 (via connector 214) and change the pulse string.

In some implementations, the slave circuit may enable slave devices 210, 220 to change the pulse string by decreasing the number of pulses within the pulse string. In some implementations, the slave circuit may enable slave devices 210, 220 to change the pulse string by increasing the number of pulses within the pulse string.

The positions of slave devices 210, 220 on series connection 300A, 300B may be determined via the pulse string received by slave devices 210, 220. The positions of slave devices 210, 220 on series connection 300A, 330B may be determined based on the number of pulses received and/or counted by slave devices 210, 220. The addresses of slave devices 210, 220 may be determined based on positions of slave devices 210, 220 on series connection 300A, 300B.

Figure 2:
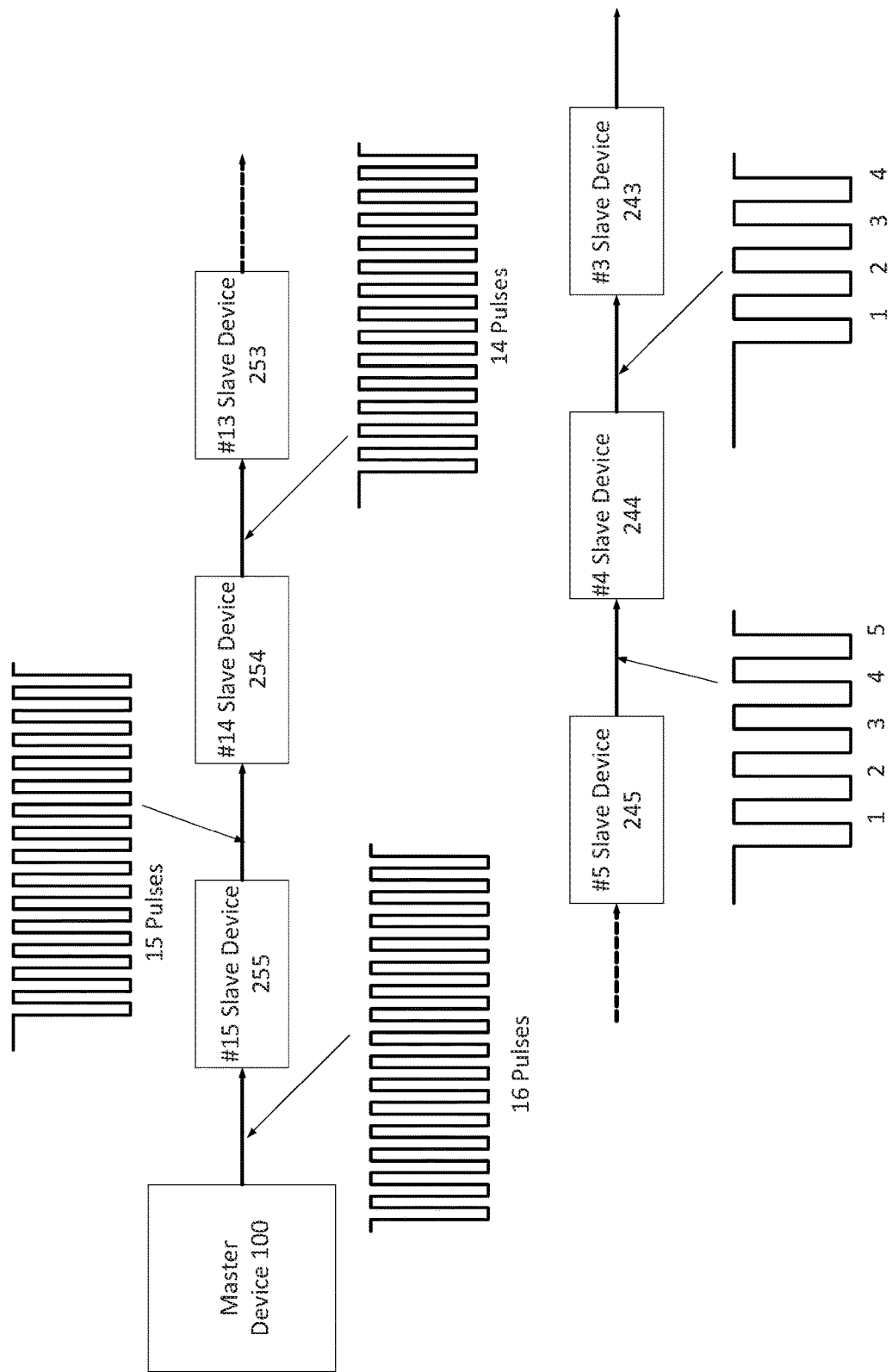
FIG. 2 illustrates exemplary pulse string used to determine addresses of slave devices in accordance with some implementations of the disclosure.

For example, FIG. 2 illustrates exemplary pulse string used to determine addresses of slave devices in accordance with some implementations of the disclosure. In FIG. 2, a series connection may include fifteen slave devices (e.g., slave devices #1-15). Master device 100 may send out a pulse string containing sixteen pulses on the series connection. #15 slave device 255 may receive the pulse string, shave off a pulse from the pulse string, count the remaining fifteen pulses, and send the pulse string down the series connection. #14 slave device 254 may receive the pulse string, shave off a pulse from the pulse string, count the remaining fourteen pulses, and send the pulse string down the series connection. The pulse string may be subsequently received, changed and counted by individual slave devices until #1 slave device (not shown) receives the pulse string containing two pulses, shaves off a pulse from the pulse string, and counts one pulse. As another example, the series connection shown in FIG. 2 may include sixteen slave devices (e.g., slave devices #0-15). #0 slave device (not shown), may receive the pulse string containing a pulse, shave off the pulse from the pulse string, and count zero pulse.

Positions of individual slave devices on the series connection may be determined based on the number of pulses counted by the individual slave devices. For example, the position of #15 slave device on the series connection (first position on the series connection) may be determined based on the fifteen pulses counted by #15 slave device 255. In some implementations, the pulses may be counted by the slave devices before a pulse is shaved off from the pulse string.

Addresses of individual slave devices may be determined based on the positions of individual slave devices on the series connection. The slave circuit may enable slave devices to send an identification message to master device 100. Individual slave devices may send an identification message to master device 100 in response to receiving the pulse string. Individual slave devices may send an identification message to master device 100 in response to receiving a request for identification. Individual slave devices may send an identification message to master device 100 as part of boot-up/configuration stage. The identification message may include information about the identity and/or the address of the individual slave devices. Information about the identity of a slave device may include identification information (e.g., device type, device ID, device characteristics, device status) relating to the slave device and/or identification information relating to other devices connected to the slave device. Information about the address of the slave device may include information relating address assigned/to be assigned to the slave device and/or the position of the slave device in the series connection.

For example, in response to receiving the pulse string, #15 slave device 255 may send an identification message to master device 100. The identification message from #15 slave device 255 may include identification information relating to #15 slave device 255 and/or other devices connected to #15 slave device 255. The identification message from #15 slave device 255 may include information relating to address assigned/to be assigned to #15 slave device 255 (e.g., address "15") and/or the position of the slave device in the series connection (e.g., first position). As another example, in response to receiving the pulse string, #1 slave device (not shown in FIG. 2) may send an identification message to master device 100. The identification message from #1 slave device may include identification information relating to #1 slave device and/or other devices connected to #1 slave device. The identification message from #1 slave device may include information relating to address assigned/to be assigned to #1 slave device (e.g., address "1") and/or the position of the slave device in the series connection (e.g., fifteenth position).

In the example in which the series connection includes fifteen slave devices, address "0" may be used by master device 100 to communicate with all slave devices on the series connection. In the example in which the series connection includes sixteen slave devices, address "0" may be used by master device 100 to communicate with the last slave device (e.g., slave device #0) in the series connection.

Reduction of the pulses in the pulse string may be referred to as pulse shaving. In some implementations, pulse adding may be used to determine addresses of slave devices on a series connection. In pulse adding, individual slave devices may receive a pulse string from a previous device, add a pulse to the pulse string, count the pulses, and send the pulse string to the next device. In some implementations, the pulses may be counted by the slave devices before a pulse is added to the pulse string.

The use of the pulse string may enable addressing of multiple slave devices on the series connection based on the positions of the slave devices on the series connection. The use of the pulse string may enable addressing of identical slave devices on the series connection based on the positions of the slave devices on the series connection. For example, slave devices on the series connection shown in FIG. 2 (e.g., slave devices #1-15) may be identical devices. The use of pulse string to determine addresses of the slave devices may enable addressing of the slave devices without customizing individual slave devices. For example, slave devices on the series connection may be distinguished from each other based on their positions rather than some mechanism (e.g., variable resistance) to distinguish the identical slave devices on the series connection.

The use of pulse string to determine addresses of the slave devices may enable addressing of the slave devices using a single pin. For example, slave devices on the series connection may be distinguished from each other based on their positions rather than using multiple address pins to individually assign different addresses to the slave devices.

The use of pulse string to determine addresses of the salve devices may enable individual slave devices to have multiple addresses. For example, the series connection shown in FIG. 2 may form a loop—i.e., last slave device (e.g., #1 slave device in fifteen devices example, #0 slave device in sixteen devices example) may be connected to master device 100. Individual slave devices in a looped series connection may have different addresses based on whether the pulse string is sent by master device 100 in a clockwise direction or a counterclockwise direction. For example, if the pulse string is sent in a clockwise direction, #15 slave device 255 may be in the first position in the series connection and may have address of "15." If the pulse string is sent in a counterclockwise direction, #15 slave device 255 may be in the fifteenth position in the series connection and may have address of "1." Other positions and addressing of slave devices are contemplated.

Master device 100 may send the pulse string on the series connection in every communication sent on the series connection. For example, master device 100 may include the pulse string in every command frame (described herein) sent on the series connection. Master device 100 may send the pulse string on the series connection in/during setup of the series connection. For example, when the series connection is established with fifteen slave devices, master device 100 may send the pulse string on the series connection to establish the positions/addresses of the slave devices. Master device 100 may send the pulse string on the series connection based on changes in direction of communication on the series connection. For example, when the direction of communication changes from clockwise direction to counterclockwise direction, or vice versa, master device 100 may send the pulse string on the series connection to determine the positions/addresses of the slave devices in the changed direction of communication.

In some implementations, a pulse string may be used to confirm the configuration of slave devices on a series connection. For example, the pulse string may be sent on a series connection during power up of master device 100 to determine the number of slave devices on the series connection, and may at a later time (e.g., after passage of a time duration, after reset of master device 100, upon request for confirmation of slave device configuration on the series connection) be used to confirm that the same number of slave devices are on the series connection. A difference in the number of slave devices detected via the pulse string may indicate a change in the system and/or a loss of connection to one or more slave devices.

Figure 3:
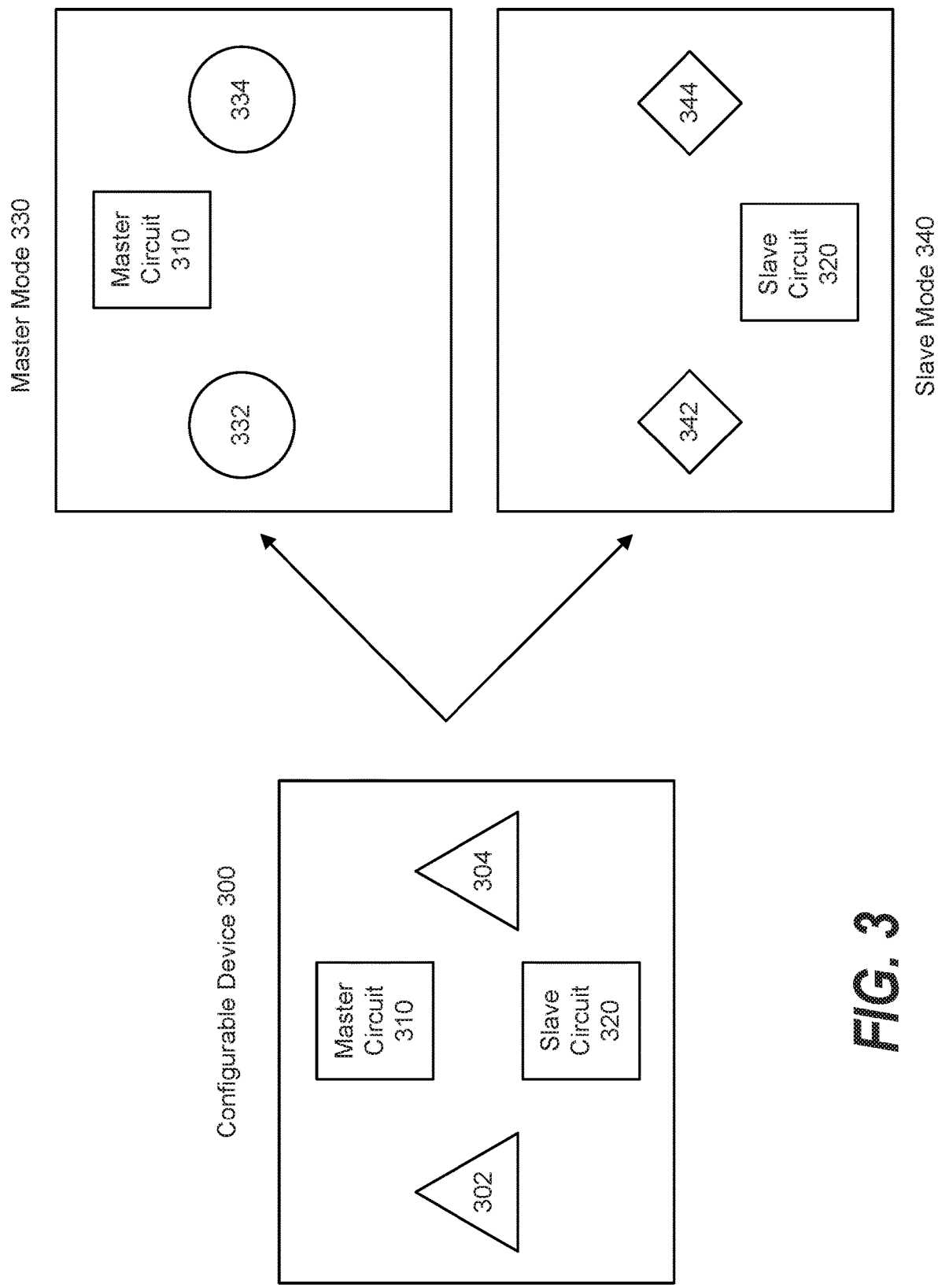
FIG. 3 illustrates an exemplary configurable device, a master mode, and a slave mode in accordance with some implementations of the disclosure.

FIG. 3 illustrates an exemplary configurable device 300 for pulse-based communication on a series connection. Configurable device 300 may include master circuit 310, slave circuit 320, and/or other circuits. Configurable device 300 may include connectors 302, 304, and/or other connectors. Configurable device 300 may include other components not shown in FIG. 3. For example, configurable device 300 may include one or more of a processor, a memory (volatile and/or non-volatile), internal and external connections, and/or other components.

Configurable device 300 may be configured in master mode 330, slave mode 340, or other modes. In some implementations, configurable device 300 may be reconfigurable between master mode 330 and slave mode 340. In some implementations, configurable device 300 may be configurable once in master mode 330 or slave mode 340, i.e., configurable device 300 may be one-time programmable.

Master mode 330 may enable configurable device 300 to use master circuit 310 and operate as described above with respect to master device 100. In master mode 330, configurable device 300 may use connectors 332, 334 as master device 100 uses connectors 102, 104. Slave mode 340 may enable configuration device 300 to use slave circuit 320 and operate as described above with respect to slave device A 210. In slave mode 340, configurable device 300 may use connectors 342, 344 as salve device A 210 uses connectors 212, 214.

Although master circuit 310 and slave circuit 320 are shown as separate components in FIG. 3, this is merely for ease of reference and is not limiting. For example, master circuit 310 may refer to a microcontroller that provides functionalities of master device 100 and slave circuit 320 may refer to a microcontroller that provides functionalities of slave device A 210. Master circuit 310 and slave circuit 320 may refer to a microcontroller that can enable/disable certain functions based on the mode of operations. Master circuit 310 and/or slave circuit 320 may refer to a virtual microcontroller that may operate in one or both modes.

The master circuit/slave circuit may enable master device 100/slave devices 210, 220 on series connection 300A, 300B to determine the direction of communication on series connection 300A, 300B. For example, referring to FIG. 1A, master device 100, slave device A 210, slave device B 220 may determine whether a communication is being sent from left-to-right or right-to-left on series connection 300A. Referring to FIG. 1B, master device 100, slave device A 210, slave device B 220 may determine whether a communication is being sent in a clockwise direction or a counterclockwise direction on series connection 300B.

The master circuit/slave circuit may further enable the master device 100/slave devices 210, 220 on series connection 300A, 300B to set/change the direction of communication on series connection 300A, 300B. For example, referring to FIG. 1A, master device 100 may send a message to slave device A 210 using connectors 104, 212 and slave device A 210 may determine that the message is being sent by master device 100 to slave device A 210 using connectors 104, 212—i.e., the communication is being sent from left-to-right. Slave device A 210 may change the direction of communication on series connection 300A and send a reply to master device 100 using connectors 104, 212—i.e., the communication is being sent from right-to-left. As another example, referring to FIG. 1B, slave device B 220 may determine that a message is being sent by master device 100 to slave device B 2200 using connectors 102, 224—i.e., the communication is being sent in a counterclockwise direction. Slave device B 220 may change the direction of communication on series connection 300B and send a reply to master device 100 using connectors 102, 224—i.e., the communication is being sent in a clockwise direction.

Figure 4A:
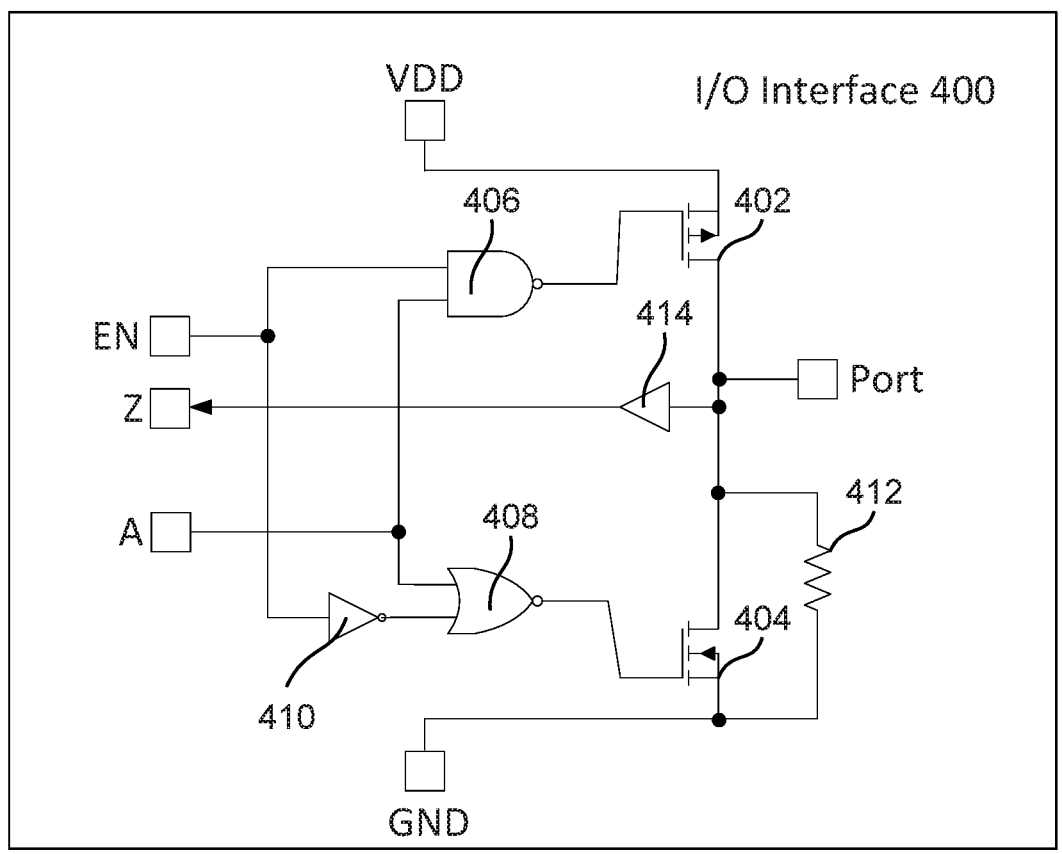
FIGS. 4A-4B illustrate exemplary I/O interface including tristate circuitry in accordance with some implementations of the disclosure.
Figure 4B:
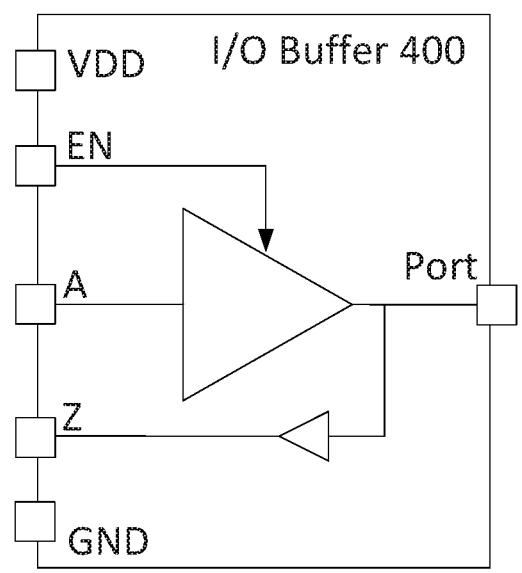

Determining, setting, and changing the direction of communication on a series connection may be effectuated via uses of a tristate logic. FIG. 4A illustrates exemplary I/O interface 400 of master device 100 and slave devices 210, 220. FIG. 4B illustrates a simplified view of I/O interface 400. I/O interface 400 may include tristate circuitry that enables master device 100 and slave devices 210, 220 to determine, set, and/or change the direction of communication on a series connection. As shown in FIG. 4A, I/O interface 400 may include transistors 402, 404, NAND gate 406, NOR gate 408, inverter gate 410, resistor 412, and/or other components. I/O interface 400 may optionally include buffer gate 414. I/O interface 400 may use signals from lines EN and A, which is processed by NAND gate 406, to activate/deactivate transistor 402.

Master device 100 and slave devices 210, 220 may set/change the direction of communication on a series connection by driving the Port high or low. Activating transistor 402 and deactivating transistor 404 may drive the Port high using VDD. Deactivating transistor 402 and activating transistor 404 may drive the Port low using GND.

Master device and slave devices 210, 220 may determine the direction of communication on a series connection by driving the port soft low. Deactivating transistors 402, 404 may drive the Port soft low using resistor 412. Driving the Port soft low may enable I/O interface 400 to be driven high or low based on the signal received at the Port—i.e., the signal received from a connected master device/slave device. Driving the Port soft low may effectuate listening on the series connection to determine whether a signal is received from another device at the Port. The received signal (high, low) may be passed onto Z.

Figure 5:
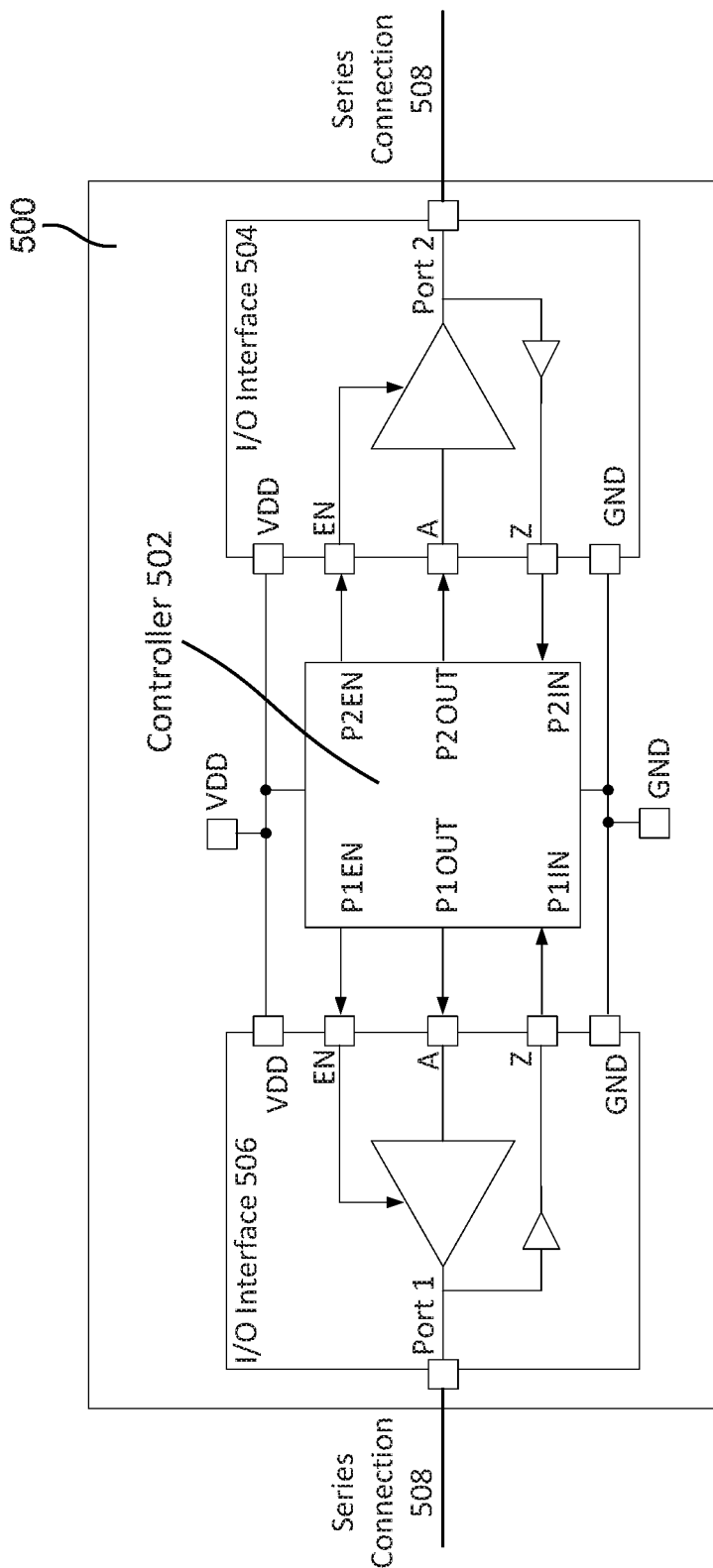
FIG. 5 illustrates an exemplary symmetrical device in accordance with some implementations of the disclosure.

FIG. 5 illustrates exemplary structure 500 of master device 100 and slave devices 210, 220. Structure 500 may include controller 502, I/O interfaces 504, 506, and/or other components. I/O interfaces 504, 506 may be connected to controller 502. I/O interface 504 may enable controller 502 to receive and/or send messages from the right side of series connection 508. I/O interface 506 may enable controller 502 to receive and/or send messages from the left side of series connection 508. Structure 500 may be symmetrical (like pins of controller 502 may be connected to like pins of interfaces 504, 506). Symmetrical nature of structure 500 may allow master device 100 and slave devices 210, 220 to wait for, receive, and send messages in either direction on series connection 508.

Figure 6:
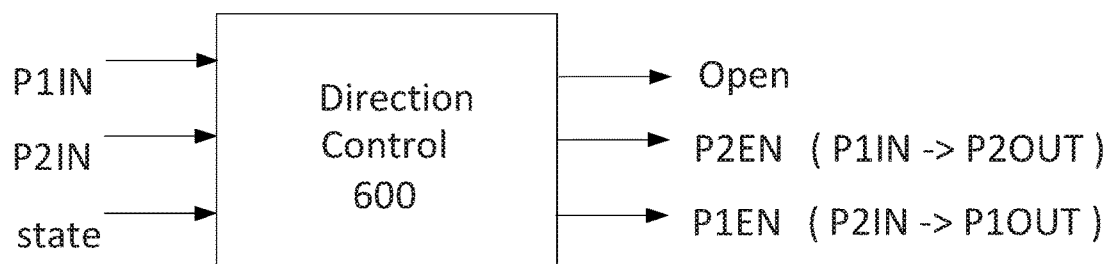
FIG. 6 illustrates exemplary communication direction control in accordance with some implementations of the disclosure.

FIG. 6 illustrates exemplary communication direction control 600 for master device 100 and slave devices 210, 220. Direction control 600 may take in as input one or more of P1 IN signal, P2IN signal, state signal, and/or other signals. Based on the one or more input signals, direction control 600 may determine that the communication is open (no signal received at either side of structure 500), may enable P2EN (signal received at P1 IN is forwarded to P2OUT), or may enable P1EN (signal received at P2IN is forwarded to P1OUT). For example, direction control 600 may enable P1EN based on receiving a signal at P2IN. Enabling P1EN may effectuate forwarding of the signal received at P2IN to P1OUT. Direction control 600 may enable P2EN based on receiving a signal at P1IN. Enabling P2EN may effectuate forwarding of the signal received at P1IN to P2OUT. Direction control 600 may switch between P1EN and P2EN based on the state indicating that a change in direction of communication is required. For example, the state may indicate a slave device on a series connection has been sent a read command by a master device. The direction of communication may be changed so that one or more requested data may be sent from the slave device to the master device. In some implementations, a slave device may provide one or more requested data on both ports of the slave device in response to receiving a read request. As another example, the direction of communication may change based on the state indicating the end of a command.

Figure 7:
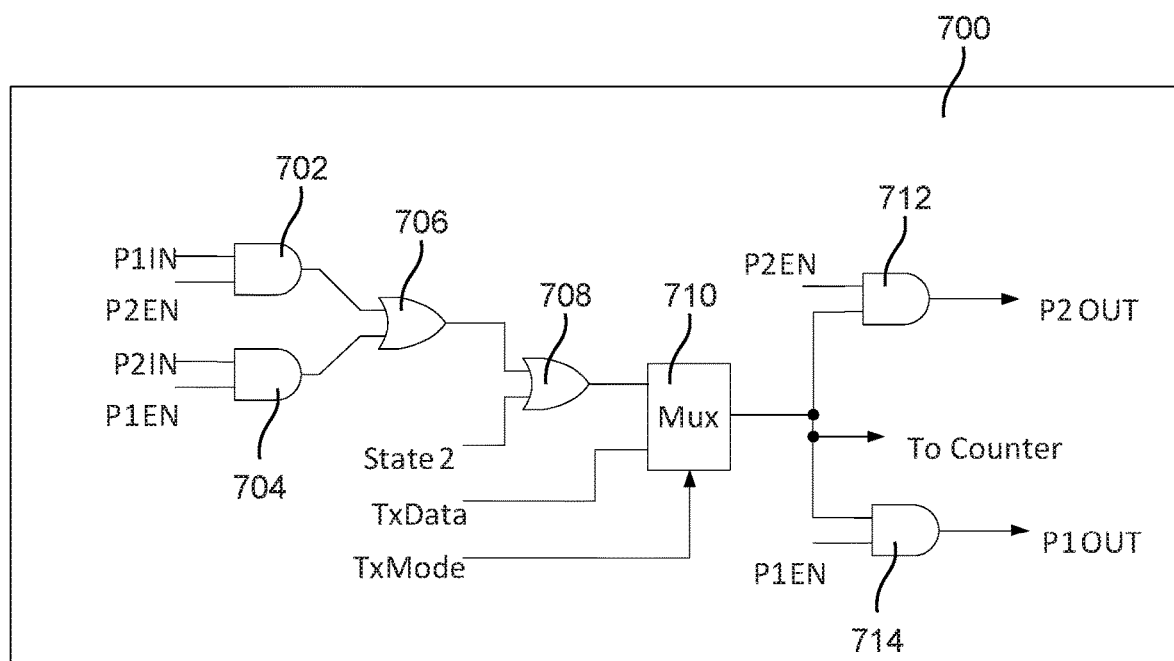
FIG. 7 illustrates exemplary circuitry for pulse shaving in accordance with some implementations of the disclosure.

FIG. 7 illustrates exemplary circuitry 700 for pulse shaving in accordance with some implementations of the disclosure. Circuitry 700 may include AND gates 702, 704, 712, 714, OR gates 706, 708, mux 710, and/or other components. AND gate 702 may pass through signal from P1 IN when P2EN is enabled. AND gate 704 may pass through signal from P2IN when P1EN is enabled. OR gate 706 may pass through high signal from AND gate 702 or AND gate 704. OR gate 708 may pass through high signal from OR gate 706 or State 2. Mux 710 may select one or more signals from OR gate 708 and TxData and forward the signals to AND gates 712, 714 and the Counter. For example, when TxMode is low, Mux 710 may select and output the signals from OR gate 708. When TxMode is high, Mux 710 may select and output the signals from TxData (e.g., data to be transmitted from a slave device to a master device during a read command). AND gate 712 may pass through the signal from Mux 710 to P2OUT when P2EN is enabled. AND gate 714 may pass through the signal from Mux 710 to P1OUT when P1EN is enabled.

Figure 8:
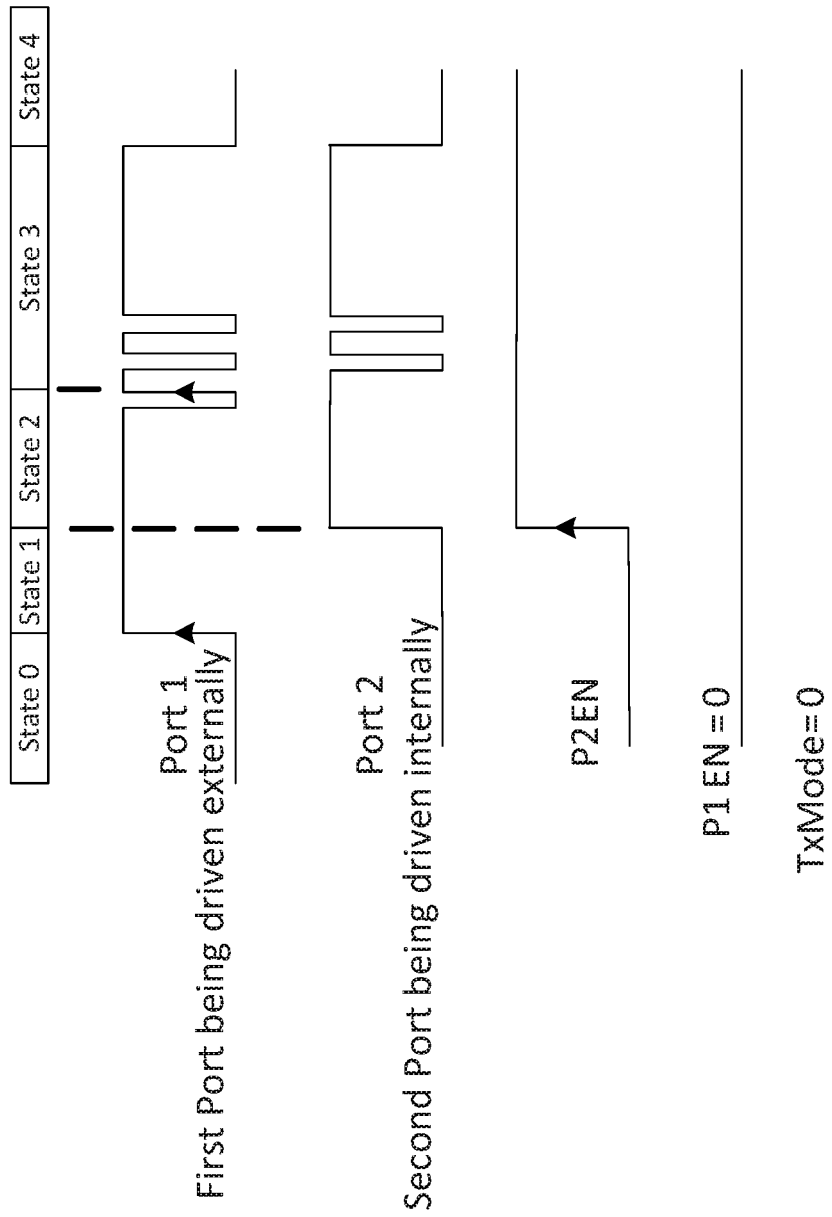
FIG. 8 illustrates exemplary pulse shaving in accordance with some implementations of the disclosure.

OR gate 708 may use signal from State 2 to remove a pulse from a pulse string. When State 2 is disabled, OR gate 708 may pass through the signal from OR gate 706. When State 1 is enable, OR gate 708 may pass on a high signal regardless of the signal from OR gate 706. FIG. 8 illustrates exemplary pulse shaving using circuitry 700.

At State 0 (e.g., default rest state), master device 100/slate devices 210, 220 may be listening on Port1 and Port2. At State 1, Port1 may be driven high by an external signal (the signal received from a connected master device/slave device). At State 2, Port2 may be driven high by internal logic of the master/slave device. State 2 may include receiving a first pulse of a pulse string at Port1. Because State 2 is enabled at OR gate 708 (shown in FIG. 7), the first pulse of the pulse string received during State 2 may not be duplicated at Port2. State 2 may end after the first pulse of the pulse string is received at Port1. Subsequent pulses of the pulse string and other pulses (e.g., pulses for command frame) may be duplicated during State 3. State 4 may follow the end of the command.

The master circuit may enable master device 100 to send one or more commands or other information on series connection 300A, 300B. One or more commands may be included in a command frame. A command frame may refer to a frame of data containing command(s) sent by master device 100. Commands may be directed to one or more slave devices 210, 220 using addresses of slave devices 210, 220 determined based on the position of slave devices 210, 220 on series connection 300A, 300B. In some implementations, a message may include acknowledge, error checking requests, and/or other information.

Master device 100 and slave devices 210, 220 may use one or more line codes to communicate messages (e.g., send, receive, forward) on series connection 300A, 300B. Line coding may enable master device 100 and slave devices 210, 220 to communicate messages on a single line of communication. For example master device 100 and slave devices 210, 220 may communicate with each other via Manchester coding. Uses of other types of encoding are contemplated.

Figure 9A:
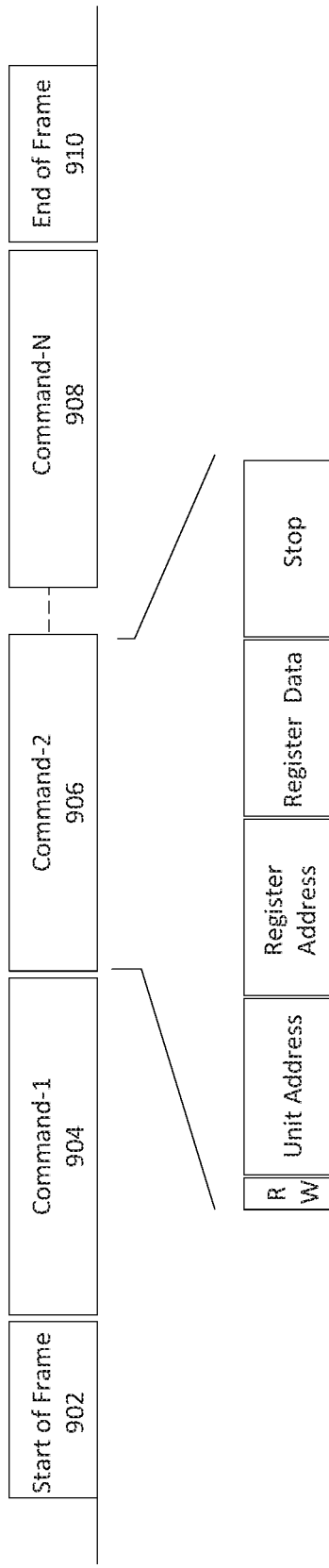
FIGS. 9A-9B illustrate exemplary frame structures in accordance with some implementations of the disclosure.
Figure 9B:
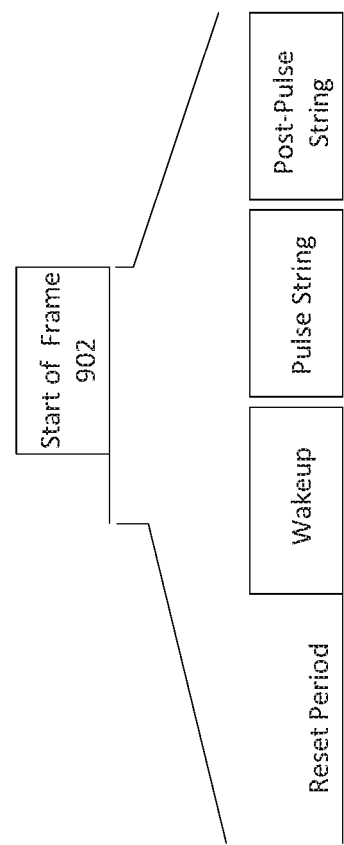

FIGS. 9A-9B illustrate exemplary structures of a command frame in accordance with some implementations of the disclosure. As shown in FIG. 9A, the structure of a command frame may include start of frame 902, one or more commands (e.g., command-1 904, command-2 906, command-N 908), end of frame 910, and/or other information. Start of frame 902 may include waking up slave devices and/or defining positions/addresses of the slave devices on a series connection. One or more commands 904, 906, 908 may be directed to a particular slave device, multiple slave devices, and/or all slave devices on the series connection. For example, a command frame may include multiple commands addressed to one of the slave devices on the series connection, two or more of the slave devices on the series connection, or all slave devices on the series connection.

Commands 904, 906, 908 within a command frame may be structured as shown in FIG. 9A. A command within a command frame may include a read/write bit, unit address, register address, register data, a stop, and/or other information. Read/write bit may indicate whether the operation to be performed is a read operation or a write operation. Unit address may indicate the address of the slave device on the series connection (e.g., 0-15). Register address may indicate the register address of the slave device. Register address may include an actual register or an executable address. Register data may include the data to be written to the slave device/register or may include data to be read from the slave device/register. Stop may signal the end of the command. For a write command, data to be loaded into a command register may be ready for execution if the unit address and the assigned address of the slave device matches. In some implementations, a command may include a 21-bit package-1 bit read/write bit, 4 bit unit address, 8 bit register address, 8 bit register data—in encoded Manchester form. Other sizes and forms of line coding are contemplated.

Commands within a command frame may be executed by individual slave devices at the end of individual commands, at the end of the command frame, or after the command frame. For example, command-1 904 may be directed to slave device A 210 and command-2 906 may be directed to slave device B 220. In some implementations, slave device A 210 may execute the operation(s) contained in command-1 904 at the end of command-1 904 and slave device B 220 may execute the operation(s) contained in command-2 906 at the end of command-2 906. In some implementations, slave device A 210 may execute the operation(s) contained in command-1 904 and slave device B 220 may execute the operation(s) contained in command-2 906 at the end of frame 910. In some implementations, slave device A 210 may execute the operation(s) contained in command-1 904 and slave device B 220 may execute the operation(s) contained in command-2 906 after the end of frame 910 (e.g., in response to receiving a command to execute previously received commands including the operation(s)).

In some implementations, a command frame may include an execution mode command. For example, a command frame may include a synchronous/non-synchronous command bit(s) between read/write bit and unit address, and/or other locations within the command frame. An execution mode command may indicate whether slave devices receiving commands should execute the commands at the end of individual commands (non-synchronous mode) or at/after the end of the command frame (synchronous mode). In a synchronous mode of command execution, slave devices may execute commands within a command frame at or after the end of the command frame. In a non-synchronous mode of command execution, slave devices may execute commands within the command frame at the end of individual commands.

The synchronous mode of command execution may enable master device 100 to sequence operations of multiple slave devices. For example, a series connection may include slave devices shown in FIG. 2. Using the synchronous mode of command execution, master device 100 may send a series of commands in any order to be executed simultaneously at the end of the command frame. Master device 100 may send command frames with synchronous mode of command execution so that operations of the slave devices are set in the slave devices before they are triggered at the same time. Master device 100 may send command frames with asynchronous mode of command execution so that different slave devices/groups of slave devices execute operations are different times. For example, master device 100 may send command frames addressed to slave devices such that one or more of #15 slave device 255, #14 slave device 254, #13 slave device 253, #5 slave device 245, #4 slave device 244, #3 slave device 243, and/or other slave device execute their operations before other slave devices. For example, master device 100 may send command frames using synchronous mode of command execution so that #13 slave device 253 and #5 slave device 245 are activated together, followed by #4 slave device 244, followed by #15 slave device 255 and #3 slave device 243. Other sequencing of slave devices by master device 100 is contemplated.

Start of frame 902 within a command frame may be structured as shown in FIG. 9B. Start of frame 902 may include a reset period, a wakeup, a pulse string, a post-pulse string, and/or other information. Reset period may provide a static logic low for a period of time. A static logic low of a certain duration may indicate that a previous command frame (if any) has completed and that a new command frame may start. Wakeup may provide a static logic high for a period of time. A static logic high may signal the start of a new command frame and may allow one or more slave units on the series connection to wake up (e.g., activate their internal oscillators and biasing, etc.) to be ready to receive commands. A pulse string may include one or more pulses for determining positions of the slave devices on the series connection and/or addresses of the slave devices. A post-pulse string may include a static logic high to signal the end of a pulse string.

Figure 10A:
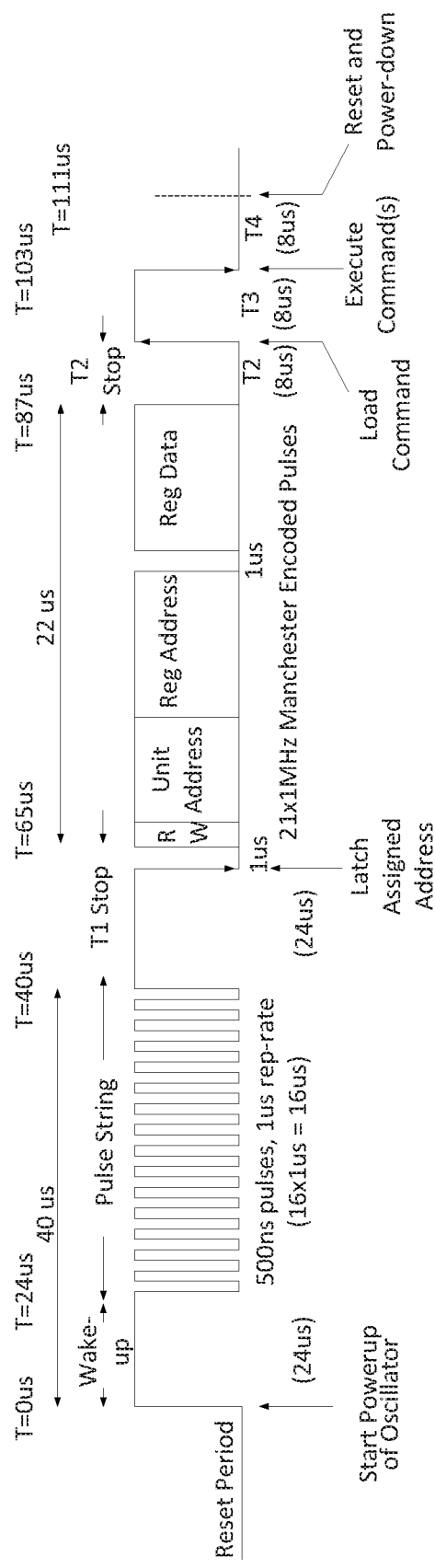
FIG. 10A illustrates an exemplary single command frame in accordance with some implementations of the disclosure.

FIG. 10A illustrates an exemplary single command frame in accordance with some implementations of the disclosure. Timings within FIG. 10A are provided as examples and are not limiting. Other timings of command frames are contemplated. In FIG. 10A, the command frame may begin with a reset period. The reset period may be followed by wake-up—a static high of 24 us. The wake-up may wake up one or more slave devices on the series connection. The wake-up may be followed by a pulse string containing one or more pulses. The pulse string may include 500 ns pulses with 1 us repetition rate. For example, 16 pulses may correspond to a total duration of 16 us. The pulse string may be followed by a post-pulse string/T1 Stop—static logic high of 24 us—to signal the end of the pulse string. Addresses assigned to individual slave devices via the pulse string may be latched at the end of T1 Stop.

After a 1 us delay, the command may be provided. The command may have a duration of 22 us. The command may include twenty-one 1 MHz Manchester encoded pulses. The command may include a 1 us wait period between Reg Address and Reg Data. The 1 us wait period may provide a turn-around-and-wait period during which the direction of communication on the series connection may change if a read command is requested. This wait period may allow for the data to be read from the register of the slave device. The command may be followed by a stop indicating the end of the command (T2 Stop). The end of the command may be followed by a stop indicating the end of the command frame (T3). The command may be loaded at the end of T2 Stop and may be executed at the end of T3. The end of the command frame may be followed by reset period (T4). After the rest period, the slave devices may reset and power-down.

Figure 10B:
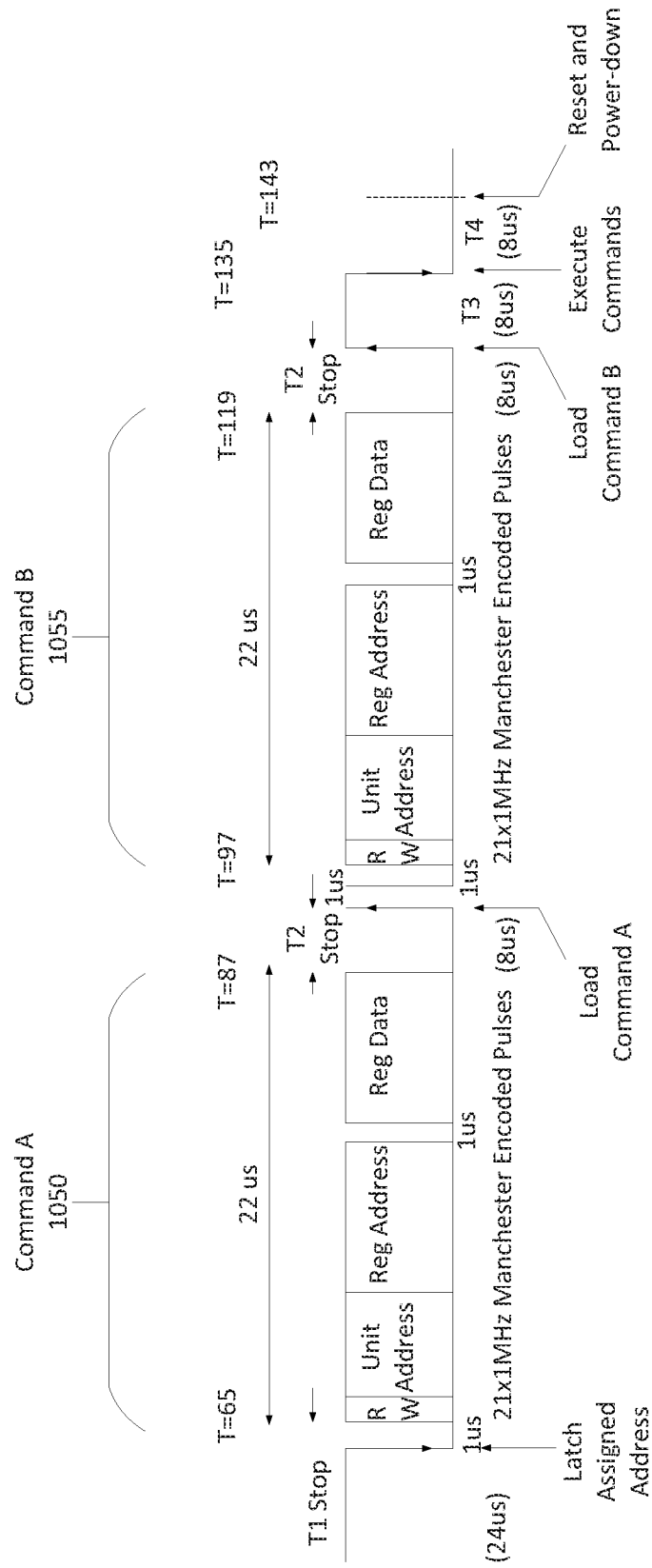
FIG. 10B illustrates a portion of an exemplary multiple command frame in accordance with some implementations of the disclosure.

FIG. 10B illustrates a portion of an exemplary multiple command frame in accordance with some implementations of the disclosure. Timings within FIG. 10B are provided as examples and are not limiting. Other timings of command frames are contemplated. In FIG. 10B, the command frame may include two commands (command A 1050 and command B 1055). Command A 1050 may be provided after the latching of addresses assigned to the slave devices and a 1 us delay. Command A 1050 may be followed by T2 Stop indicating the end of command A 1050. Command A 1050 may be loaded at the end of T2 Stop (Load Command A). Command B 1055 may be provided after a 1 us delay. Command B 1055 may be followed by T2 Stop indicating the end of command B 1055. Command B 1055 may be loaded at the end of T2 Stop (Load Command B). Command A 1050 and command B 1055 may be executed after T3, indicating the end of the command frame. The execution of the commands may be following by reset period (T4). And the end of the reset period, the slave devices may reset their communication interface registers and power-down.

Figure 11B:
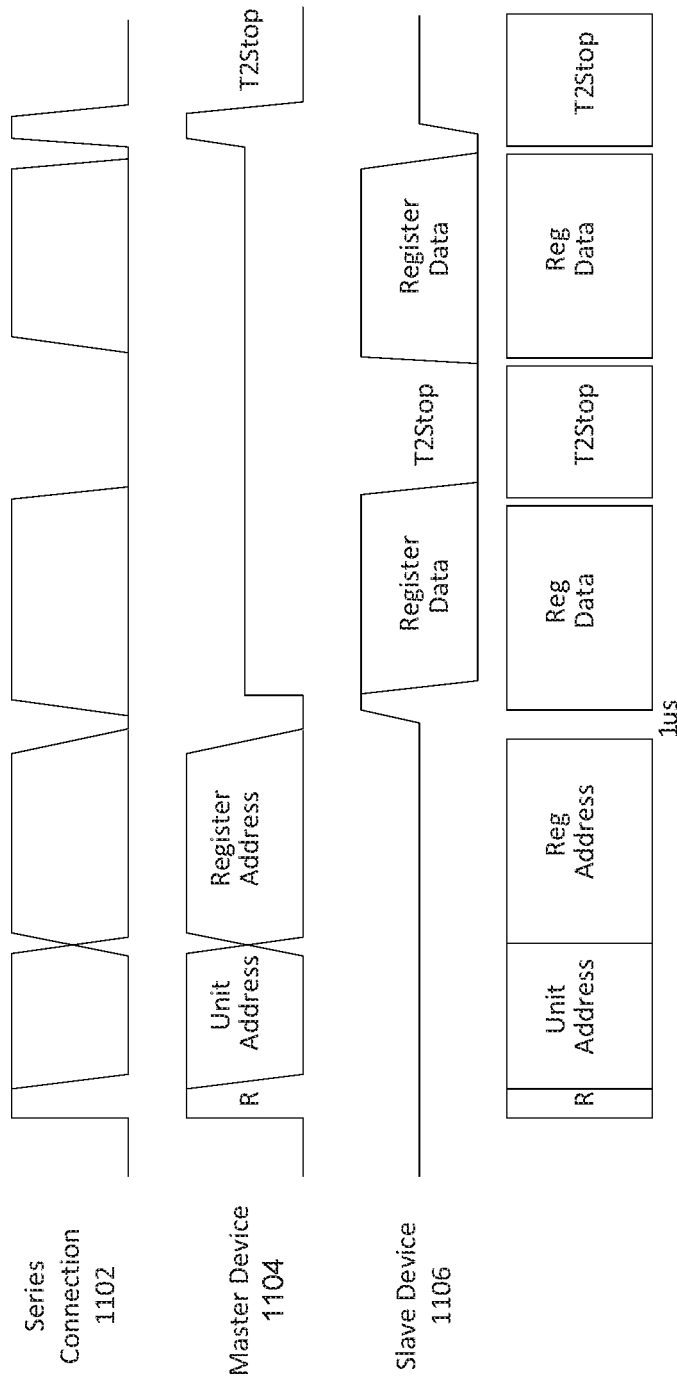
FIG. 11B illustrates exemplary signals for a multiple read command in accordance with some implementations of the disclosure.

FIG. 11A illustrates exemplary signals on series connection 1102 for a single read command in accordance with some implementations of the disclosure. FIG. 11B illustrates exemplary signals on series connection 1102 for a multiple read command in accordance with some implementations of the disclosure. As shown in FIGS. 11A-11B, read/write bit may be set high by master device 1104. Master device 1104 may continue the signal on series connection 1102 with the unit address and the register address of the slave device. After the register address is sent on series connection 1102, master device 1104 may pull low on series connection 1102.

Slave device 1106 with the matching assigned unit address may then pull high within 1 us. Slave devices between slave device 1106 (the slave device being read) and master device 1104 may change direction of communication on series connection 1102 by pulling high in reverse direction on series connection 1102. Master device 1104 may detect a high on series connection 1102 and become an input for the register data from slave device 1106. Slave device 1106 may then communicate the relevant read data (register data) to master device 1104.

The read data may end with a logic low. At the end of the read data, the register address pointer inside slave device 1106 and master device 1104 may be incremented. Master device 1104 may end the read command by pulling high on series connection 1102 (shown in FIG. 11A). If master device 1104 requires more read data, then master device 1104 may not pull high on series connection 1102. This may signal to slave device 1106 to continue communicating on series connection 1102 with read data from the next register (shown in FIG. 11B). Reading from slave device 1106 may continue until master device 1104 terminates the read function by pulling high on series connection 1102 for a certain duration of time and/or slave device 1106 indicates the end of read register addresses.

Figure 12:
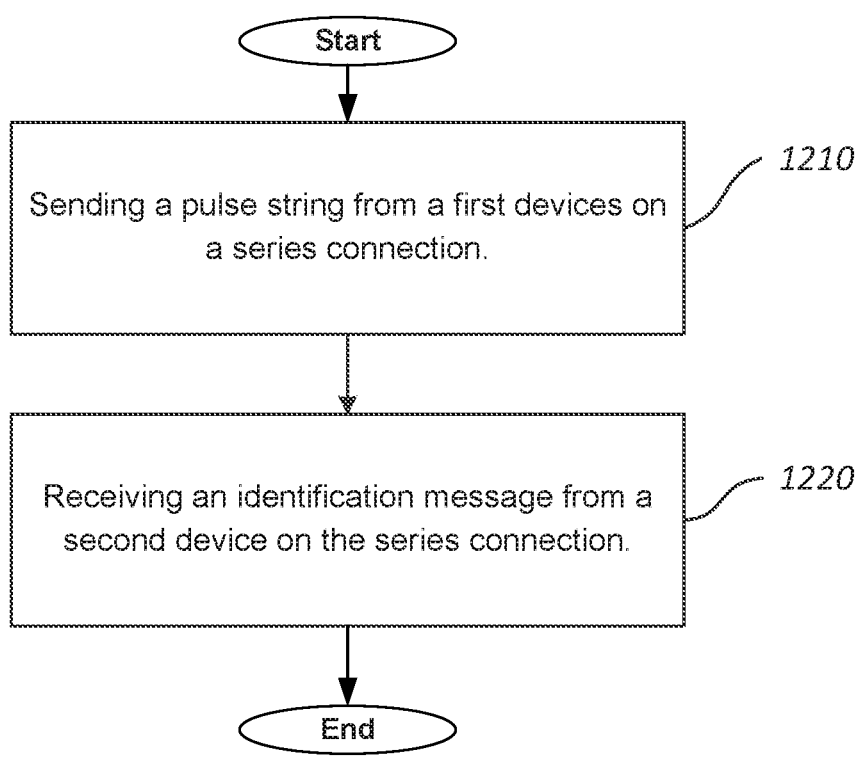
FIG. 12 illustrates a method for using pulse-based communication on a series connection in accordance with some implementations of the disclosure.

FIG. 12 illustrates method 1200 for using pulse-based communication on a series connection. The operations of method 1200 presented below are intended to be illustrative. In some implementations, method 1200 may be accomplished with one or more additional operations not described, and/or without one or more of the operations discussed. In some implementations, two or more of the operations may occur substantially simultaneously.

At operation 1210, a pulse string from a first device may be sent on a series connection. The first device may have a master circuit and the master circuit may enable the first device to communicate with a plurality of devices on the series connection. The plurality devices may have a slave circuit. The plurality devices may include a second device. The slave circuit may enable the plurality devices to receive the pulse string, change the pulse string, and send the pulse string down the series connection. The slave circuit may enable the plurality devices to send an identification message to the first device. The addresses of the plurality devices on the series connection may be determined based on positions of the plurality devices on the series connection. The positions of the plurality devices on the series connection may be determined based on the pulse string received by the plurality devices.

At operation 1220, an identification message from the second device on the series connection may be received. The identification message may be received by the first device. The identification message may include information about an identify and/or an address of the second device.

In some implementations, operations and structure of the first device may be the same as or similar to master device 100 (shown in FIGS. 1A and 1B and described herein). In some implementations, operations and structure of the second device may be the same as or similar to slave device A 210 (shown in FIGS. 1A and 1B and described herein).

Spatially relative terms such as "under," "below," "lower," "over," "upper," "left," "right," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising," and the like are open ended terms that indicate the presence of stated elements or features, but do not preclude additional elements or features. The articles "a," "an" and "the" are intended to include the plural as well as the singular, unless the context clearly indicates otherwise.

Although this invention has been disclosed in the context of certain implementations and examples, it will be understood by those skilled in the art that the present invention extends beyond the specifically disclosed implementations to other alternative implementations and/or uses of the invention and obvious modifications and equivalents thereof. Thus, it is intended that the scope of the present invention herein disclosed should not be limited by the particular disclosed implementations described above.

Furthermore, the skilled artisan will recognize the interchangeability of various features from different implementations. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular implementation of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. A system that uses pulse-based communication, the system comprising:
   a first device having a master circuit, the master circuit enabling the first device to communicate with a plurality of second devices on a series connection and to send a pulse string to the plurality of second devices on the series connection, the pulse string including a number of pulses; and
   wherein each of the plurality of second devices comprises a respective slave circuit configured to:
      receive the pulse string from a previous device on the series connection;
      change the pulse string by incrementing or decrementing by one the number of the pulses in the pulse string;
      determine an address of the second device comprising the slave circuit based only on the number of pulses in the pulse string received from the previous device before or after the incrementing or decrementing;
      send the changed pulse string to a next device on the series connection;
      receive a command frame sent by the master circuit on the series connection, wherein the command frame includes one or more addresses and one or more commands; and
      execute the one or more commands responsive to the address of the second device matching one of the one or more addresses in the command frame.

2. The system of claim 1, wherein the addresses of the plurality of second devices are determined based on positions of the plurality of second devices on the series connection.

3. The system of claim 1, wherein the plurality of second devices on the series connection are symmetrical.

4. The system of claim 1, wherein the series connection forms a loop.

5. The system of claim 1, wherein the slave circuit enables the plurality of second devices on the series connection to determine a direction of communication on the series connection.

6. The system of claim 5, wherein the slave circuit enables the plurality of second devices on the series connection to change the direction of communication on the series connection.

7. The system of claim 1, wherein the master circuit enables the first device to send the command frame on the series connection.

8. The system of claim 7, wherein the command frame includes multiple commands addressed to one of the plurality devices on the series connection.

9. The system of claim 7, wherein the command frame includes multiple commands addressed to two or more of the plurality of second devices on the series connection.

10. The system of claim 7, wherein the command frame includes a delay to allow one of the plurality of second devices on the series connection to change a direction of communication on the series connection.

11. The system of claim 7, wherein the command frame includes an execution mode command, wherein:
the plurality of second devices execute commands within the command frame at or after the end of the command frame based on the execution mode command indicating a synchronous mode of command execution; and
the plurality of second devices execute commands within the command frame at the end of individual commands based on the execution mode command indicating a non-synchronous mode of command execution.

12. The system of claim 11, wherein the synchronous mode of command execution enables the first device to sequence operations of the plurality of second devices.

13. The system of claim 1, wherein the first device include a first configurable device configured to operate in a master mode and the plurality of second devices include second configurable devices configured to operate in a slave mode.

14. A method for using pulse-based communication, the method comprising:
sending a pulse string from a first device on a series connection, the first device having a master circuit, the master circuit enabling the first device to communicate with a plurality of second devices each having a respective slave circuit on the series connection and to send a pulse string to the plurality of second devices on the series connection, the pulse string including a number of pulses;
wherein each slave circuit enables the respective second device to:
receive the pulse string from a previous device on the series connection;
change the pulse string by incrementing or decrementing by one the number of pulses in the pulse string;
send the changed pulse string to a next device on the series connection; and
determine whether the second device comprising the slave circuit is addressed based only on the number of pulses in the pulse string received from the previous device;
receive a command frame sent by the master circuit on the series connection, wherein the command frame includes one or more addresses and one or more commands; and
execute the one or more commands responsive to the address of the second device matching one of the one or more addresses in the command frame.

15. The method of claim 14, wherein the addresses of the plurality of second devices are determined based on positions of the plurality devices on the series connection.

16. A method for a device using pulse-based communication, the method comprising:
receiving a pulse string from a previous device on a series connection, the pulse string including one or more pulses;
changing the pulse string by incrementing or decrementing by one the number of pulses within the pulse string;
determining an address of the device in the series connection based only on the number of pulses within the pulse string received from the previous device before or after the incrementing or decrementing;
sending the changed pulse string to a next device on the series connection;
receiving a command frame on the series connection, wherein the command frame includes one or more addresses and one or more commands; and
executing the one or more commands responsive to the address of the device matching one of the one or more addresses in the command frame.

17. The method of claim 14, wherein each slave circuit further enables the respective second device to: receive an identification message from at least one of the plurality of second devices on the series connection, wherein the identification message includes information about an identity and an address of the at least one of the plurality of second devices; and send the identification message to the first device responsive to being addressed.

* * * * *